United States Patent
He et al.

(10) Patent No.: US 10,922,323 B2
(45) Date of Patent: Feb. 16, 2021

(54) SERVICE PROCESSING METHOD, SERVER AND COMPUTER STORAGE MEDIUM

(71) Applicant: TENCENT TECHNOLOGY (SHENZHEN) COMPANY LIMITED, Shenzhen (CN)

(72) Inventors: Ruiming He, Shenzhen (CN); Hui Xie, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 752 days.

(21) Appl. No.: 15/685,078

(22) Filed: Aug. 24, 2017

(65) Prior Publication Data

US 2017/0357651 A1  Dec. 14, 2017

Related U.S. Application Data

(63) Continuation of application No. PCT/CN2016/081337, filed on May 6, 2016.

(30) Foreign Application Priority Data

Jun. 24, 2015 (CN) .......................... 201510355294.3

(51) Int. Cl.
*G06F 16/2457* (2019.01)
*G06F 16/248* (2019.01)
(Continued)

(52) U.S. Cl.
CPC ...... *G06F 16/24578* (2019.01); *G06F 16/248* (2019.01); *G06F 16/24575* (2019.01);
(Continued)

(58) Field of Classification Search
CPC .............. G06F 16/24578; G06F 16/24575
See application file for complete search history.

(56) References Cited

U.S. PATENT DOCUMENTS 8,379,830 B1 * 2/2013 Naik .................... H04M 3/493
379/265.02
8,615,584 B2 * 12/2013 Dawson ................ G06Q 10/02
707/805
(Continued)

FOREIGN PATENT DOCUMENTS

| CN | 102855256 A | 1/2013 |
| CN | 102880501 A | 1/2013 |

(Continued)

OTHER PUBLICATIONS

International Search Report in international application No. PCT/CN2016/081337, dated Jul. 1, 2016.
(Continued)

*Primary Examiner* — Angelica Ruiz
(74) *Attorney, Agent, or Firm* — Syncoda LLC; Feng Ma

(57) ABSTRACT

Disclosed is a service processing method, a server and a computer storage medium. In the method, for each of a plurality of services, a reservation amount of the service and a usage amount of the service are determined according to service usage information of a client; the reservation amount of the service and a usage-reservation ratio parameter of the service are processed on the basis of a characteristic value strategy to obtain a characteristic value of each service, the usage-reservation ratio parameter of the service is determined on the basis of the reservation amount of the service and the usage amount of the service; and a graphical interface of the client is called to present a ranking result of characteristic values of the plurality of services.

15 Claims, 14 Drawing Sheets

(51) Int. Cl.
*H04L 29/06* (2006.01)
*H04W 4/21* (2018.01)
*H04L 29/08* (2006.01)
*G06F 3/0482* (2013.01)

(52) U.S. Cl.
CPC .............. *H04L 29/06* (2013.01); *H04L 67/22* (2013.01); *H04W 4/21* (2018.02); *G06F 3/0482* (2013.01)

(56) References Cited

U.S. PATENT DOCUMENTS

| | | | | |
|---|---|---|---|---|
| 9,940,990 | B1* | 4/2018 | Willcock | G11C 11/4091 |
| 10,474,547 | B2* | 11/2019 | McAlister | G06Q 40/04 |
| 2002/0004833 | A1* | 1/2002 | Tonouchi | H04L 29/06 |
| | | | | 709/229 |
| 2008/0040172 | A1* | 2/2008 | Watkins | G06Q 30/0203 |
| | | | | 705/5 |
| 2011/0213630 | A1* | 9/2011 | Watkins | G06Q 10/043 |
| | | | | 705/5 |
| 2013/0111487 | A1* | 5/2013 | Cheyer | H04M 1/72563 |
| | | | | 718/102 |
| 2013/0268384 | A1* | 10/2013 | Salonen | H04W 4/50 |
| | | | | 705/26.1 |
| 2014/0249960 | A1* | 9/2014 | Mello | G06Q 30/0623 |
| | | | | 705/26.61 |
| 2014/0272889 | A1 | 9/2014 | Kulkarni et al. | |
| 2014/0359482 | A1 | 12/2014 | Sinn et al. | |
| 2016/0125475 | A1* | 5/2016 | Sanio | G06Q 30/0275 |
| | | | | 705/5 |

FOREIGN PATENT DOCUMENTS

| | | |
|---|---|---|
| CN | 103338223 A | 10/2013 |
| CN | 103475644 A | 12/2013 |
| CN | 2016/081337 A2 | 7/2016 |
| JP | 2012014444 A | 1/2012 |
| JP | 2012058985 A | 3/2012 |
| KR | 20140066278 A | 6/2014 |

OTHER PUBLICATIONS

English Translation of the Notification of the First Office Action of Japanese application No. 2018-500847, dated Oct. 2, 2018.
English Translation of the Written Opinion of the International Search Authority in international application No. PCT/CN2016/081337, dated Jul. 1, 2016.
Second Office Action of the Chinese application No. 201510355294.4, dated Apr. 1, 2020.
Notice of Allowance of the Korean application No. 10-2017-7028673, dated Mar. 28, 2019.

* cited by examiner

SERVICE PROCESSING METHOD, SERVER AND COMPUTER STORAGE MEDIUM

CROSS-REFERENCE TO RELATED APPLICATIONS

This is a continuation application of International Patent Application No. PCT/CN2016/081337, filed on May 6, 2016, which claims priority to Chinese Patent Application No. 201510355294.4 filed on Jun. 24, 2015. The disclosures of these applications are hereby incorporated by reference in their entirety.

BACKGROUND

Along with development of the Internet, social applications are used more and more widely for a terminal, particularly a mobile terminal, and the social applications (such as WeChat and WhatsApp) have a basic social function, namely serving as a channel for social activities between users, such as voice communication, short message communication and information (photo, video, webpage and etc.) sharing.

If various services are integrated into a social application in an All-In-One manner, for services of a same type, regarding how to accurately determine qualities (or user-oriented recommendation degrees) of the different services to help a user to rapidly select a service to be used, there is yet no effective solution in the related art.

SUMMARY

The disclosure relates to Internet technologies in the field of communications, and more particularly to a service processing method, a server and a computer storage medium.

According to embodiments of the disclosure a service processing method, a server and a computer storage medium are provided, which may accurately determine qualities of different services and help a user to select a high-quality service for use.

An embodiment of the disclosure provides a service processing method, which includes: for each of a plurality of services, determining a reservation amount of the service and a usage amount of the service according to service usage information of a client; processing the reservation amount of the service and a usage-reservation ratio parameter of the service on the basis of a characteristic value strategy to obtain a characteristic value of the service, wherein the usage-reservation ratio parameter of the service is determined on the basis of the reservation amount of the service and the usage amount of the service; and calling a graphical interface of the client to present a ranking result of the characteristic values of the plurality of services.

An embodiment of the disclosure provides a server, which may include a processor and a memory for storing instructions executable by the processor, wherein the processor is configured to: for each of a plurality of services, determine a reservation amount of the service and a usage amount of the service according to service usage information of a client; process the reservation amount of the service and a usage-reservation ratio parameter of the service on the basis of a characteristic value strategy to obtain a characteristic value of the service, wherein the usage-reservation ratio parameter of the service is determined on the basis of the reservation amount of the service and the usage amount of the service; and call a graphical interface of the client to present a ranking result of the characteristic values of the plurality of services.

An embodiment of the disclosure provides a non-transitory computer storage medium for storing executable instructions, wherein the executable instructions are configured to execute the service processing method provided by the embodiment of the disclosure.

In the embodiments of the disclosure, the characteristic value of the service may be configured to represent a usage condition of the service, the usage-reservation ratio parameter used for the characteristic value strategy is determined on the basis of the reservation amount of the service and the usage amount of each service, and the usage-reservation ratio parameter refers to a ratio of usage of the service to the reservation amount of the service; and compared with pure utilization of the reservation amount of the service or pure utilization of the usage amount of the service, the problem that some clients excessively use some services in a centralized manner to cause excessively high characteristic values of these services may be solved, so that qualities or recommendation degrees of the services may be presented to help a user to select a high-quality service for use as a reference for service reservation of a user on the basis of ranking result of the characteristic values.

DETAILED DESCRIPTION

The disclosure will be further described below with reference to the drawings and embodiments in detail. It is to be understood that the specific embodiments described here are provided to explain the disclosure and not intended to limit the disclosure.

The embodiment of the disclosure is intended to rank services on the basis of characteristic values of the services and cause a client to present a ranking result, so as for a user to reserve a service with reference to the ranking result. Here, the services refer to offline services or online services which may be reserved with a client (social applications of various forms, such as WeChat and WhatsApp) and used on the client.

The online services refer to services which are acquired from the Internet (on line) and used on line, and include a game, electronic shopping (for example, the user reserves a shopping service on the Internet through the client, and may subsequently order a commodity by virtue of the shopping service), a chatting emotion (an emoticon which may be used for communication through the client, for example, the user reserves a set of chatting emotions through the client, and may subsequently use emoticons in the set of chatting emotions during communication with another client through the client), and a display theme (a display effect which may be replaceable by the client, if a theme is reserved, the client may subsequently be set to use the theme instead of a default theme of the client to achieve a personalized display effect of the client).

The services may also include the online services, which refer to services acquired from the Internet and used without the Internet, including dining and housekeeping. For example, if the user reserves a take-away service through the client, take-away food of a corresponding restaurant may subsequently be ordered with the service.

Figure 1:
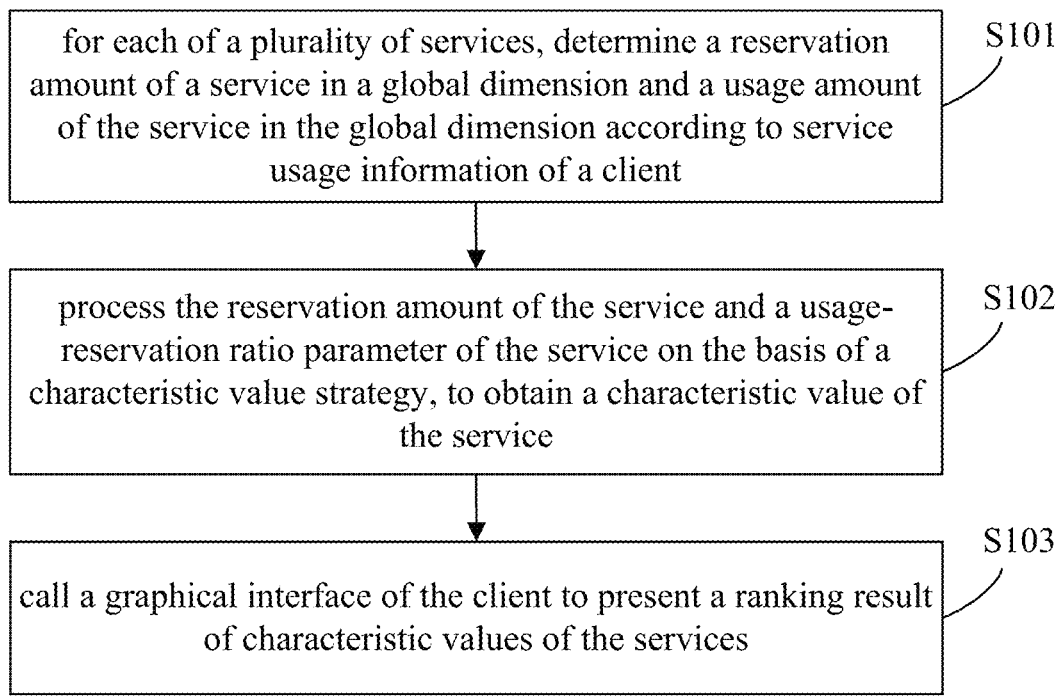
FIG. 1 is an implementation flowchart of a service processing method according to an embodiment of the disclosure.

In an implementation, FIG. 1 is an optional flowchart of a service processing method according to an embodiment of the disclosure, and the method includes the following steps.

In Step S101, for each of a plurality of services, a reservation amount of a service in a global dimension and a usage amount of the service in the global dimension are determined according to service usage information of clients.

A server may determine the reservation amount and the usage amount and analyze service usage information of all clients in the following manner: the amount of services reserved by each client in customers on which statistic is required to be performed and the reserved service used by each client are determined; and for each service, the number of the clients which reserve the service is analyzed as a reservation amount of the service in the global dimension according to an identifier of the service (the reservation amount in the global dimension refers to the number of the all the clients which reserve service), and a number of times for which the service is used by all the clients is analyzed as a usage amount of the service in the global dimension according to the identifier of the service. Executing the abovementioned processing on each service may determine the reservation amount of each service in the global dimension and the usage amount of the service in the global dimension.

Description will be made below with reference to different examples of the service.

1) For example, assuming for WeChat emotion service(s) used for a chatting process of a social application such as WeChat, a client (a client running WeChat) may report an emotion reserved (here, reservation may be considered as downloading and installation) by the client and a usage amount (sending an emotion is considered as using the reserved emotion once) of the reserved emotion to the server, and the server may analyze the number of clients which reserve the same WeChat emotion in all clients and the number of times (i.e. the usage amount) for which the WeChat emotion is used by the clients which reserve the WeChat emotion on the basis of an identifier (for example, it may be a name or a serial number) of the WeChat emotion.

2) For example, assuming for game service(s), a client (a client running WeChat) may report a game reserved (here, reservation may be considered as downloading and installation) by the client and a usage amount (running an game application once is considered as using once) of the reserved game to the server, and the server may analyze the number of clients which reserve the same game in all the clients and the number of times (i.e. the usage amount) for which the game is used by the clients which reserve the game on the basis of an identifier (for example, it may be a name or a serial number) of the game.

3) For example, assuming for electronic shopping service (s), a client (a client running WeChat) may report an electronic shopping service (such as a service provided by each salesman for shopping a commodity on a respective online sales platform) reserved (here, reservation may be considered as downloading and installation of an electronic shopping application) by the client and a usage amount (running the electronic shopping application once is considered as using once) of the reserved electronic shopping service to the server, and the number of clients which reserve the same electronic shopping service in all the clients and the number of times (i.e. the usage amount) for which the electronic shopping service is used by the clients which reserve the electronic shopping service may be analyzed on the basis of an identifier (for example, it may be a name or a serial number) of the electronic shopping application.

4) For example, for food ordering service(s), a client (a client running WeChat) may report food ordering service (such as Meituan Take-away and Eleme Take-away) reserved (here, reservation may be considered as downloading of a function of the food ordering service) by the client and a usage amount (running a food ordering function once is considered as using once) of the reserved food ordering service to the server, and the number of clients which reserve the same food ordering service in all the clients and the number of times (i.e. the usage amount) for which the food ordering service is used by the clients which reserve the food ordering service may be analyzed on the basis of an identifier (for example, it may be a name or a serial number) of the food ordering service.

In Step S102, the reservation amount of the service and a usage-reservation ratio parameter of the service are processed on the basis of a characteristic value strategy, to obtain a characteristic value of the service.

The characteristic value of the service is configured to represent quality of the service, and further represent a recommendation degree of the service. If the characteristic value is higher, the represented quality of the service is higher, so that the recommendation degree is higher, that is, the service is worthier of being recommended to a user of another client.

The characteristic value strategy includes the usage-reservation ratio parameter, the usage-reservation ratio parameter refers to a ratio of the usage amount of the service to the reservation amount of the service, and the usage-reservation ratio parameter of the service is determined on the basis of the reservation amount of the service and the usage amount of the service. Compared with pure utilization of the reservation amount of the service or pure utilization of the usage amount of the service for determining the characteristic value of the service, the problem that some clients excessively use some services in a centralized manner to cause excessively high characteristic values of these services may be solved. Since the services of such a type have the characteristics of not being widely used and relatively high characteristic values, the services are not so worthy of being recommended to the user of the other client for use. The characteristic value of the service is determined on the basis of the usage-reservation ratio parameter in the characteristic value strategy and the usage amount of the service, so that a characteristic value of service which is widely reserved and widely used may be relatively higher, while characteristic values of service which is not widely reserved but widely used and service which is widely reserved but not widely used may be relatively lower.

In Step S103, a graphical interface of the client is called to present a characteristic value ranking result of the plurality of services.

When the client requests for a service list, a descending ranking result of characteristic values of the services may be sent to the client, indicating the client to call its own graphical interface for display as a reference for service reservation of a user. When the user triggers reservation of a service, data of the corresponding service (such as an installation instruction, for presenting the corresponding service in the graphical interface of the client) may be transmitted to the client according to an identifier (such as a service name or a serial number) of the service reserved by the request reported by the client. Since a characteristic value of service which is widely reserved and widely used is relatively higher, the service is worthier of being recommended to the user who does not use the service, and quality of the service, selected by the user, with the high characteristic value is higher than quality of service with a relatively lower characteristic value.

Figure 2:
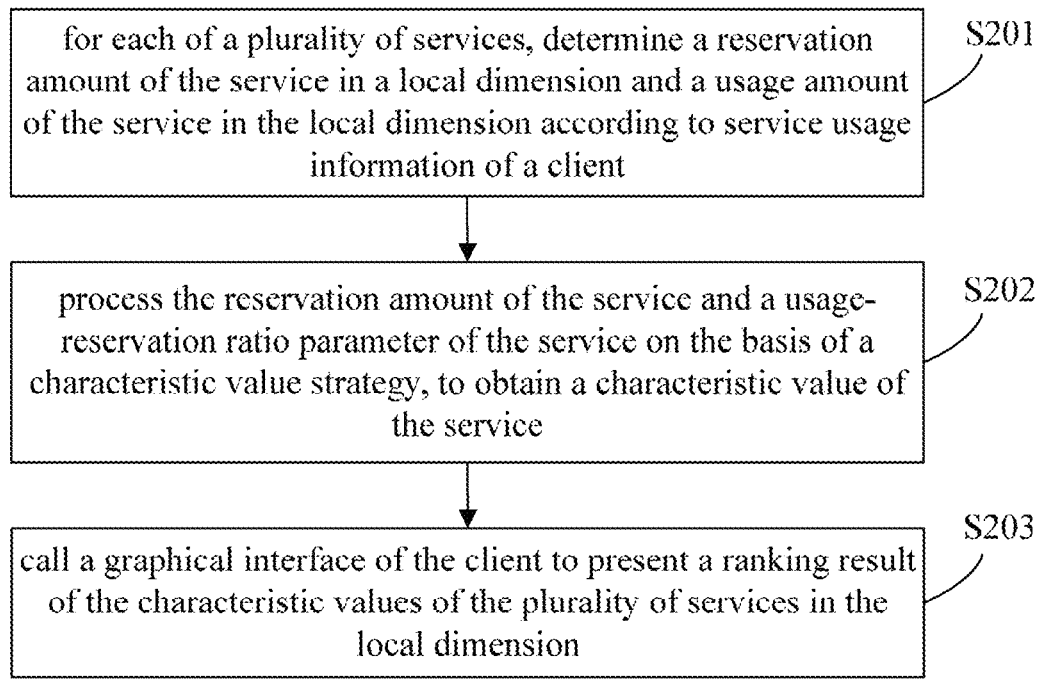
FIG. 2 is another implementation flowchart of a service processing method according to an embodiment of the disclosure.

In the abovementioned implementation, the reservation amount of the service and the usage amount of the service are determined in the global dimension, so that the obtained characteristic value of the service represents a condition of the service which is used by all users. In another implementation of the embodiment of the disclosure, the reservation amount and usage amount of the service may be determined in a local dimension (for example, clients of a specific type, such as clients which are divided into different groups in terms of genders, ages, areas, educational backgrounds, income levels and the like of users), so that the obtained characteristic value may represent a condition of use by the users in the local dimension. FIG. 2 is an optional flowchart of a service processing method, and the method includes the following steps.

In Step S201: for each of a plurality of services, a reservation amount of the service in a local dimension and a usage amount of the service in the local dimension are determined according to service usage information of a client.

Here, the local dimension may be at least one of:

1) a region of the client, i.e. a geographic position where the client is. Division of the geographic position may adopt administrative division of a province, a city and the like, and may also adopt a geographic grid;

2) an age group of a user of the client. Age information of users of different clients may adopt personal data for registration of the users with the clients;

3) a gender of the user of the client. Gender information of the users of the different clients may adopt the personal data for registration of the users with the clients;

4) the gender of the user of the client. The gender information of the users of the different clients may adopt the personal data for registration of the users with the clients; and 5) a client in a social relationship with the client, which may be a WeChat friend in WeChat, and may be a WhatsApp friend in WhatsApp or a contact in a group of another type.

The reservation amount of the service in the local dimension and the usage amount of the service in the local dimension may be determined in the following manner: service usage information reported by clients in the local dimension is selected from service usage information reported by clients, and the service usage information of the clients in the local dimension is analyzed to determine service(s) reserved by each client in the clients in the local dimension and the number(s) of times that the reserved service(s) used by each client; and the number of the clients which reserve each service is analyzed as a reservation amount of the service in the local dimension according to an identifier of the service, and the number of times for which the service is used by the clients in the local dimension is analyzed as a usage amount of the service in the local dimension according to the identifier of the service.

Description will be made below with reference to different examples.

1) For example, assuming for WeChat emotion service(s) s, a client (a client running WeChat) may report an emotion reserved (here, reservation may be considered as downloading and installation) by the client and a usage amount (sending an emoticon is considered as using the reserved emotion once) of the reserved emotion to a server, and the server selects emotion(s) reserved by clients in a local dimension and usage amount(s) of the reserved emotion(s), and may analyze the number of clients which reserve the same WeChat emotion in the clients in the local dimension and the number of times (i.e. the usage amount) for which the WeChat emotion is used by the clients which reserve the WeChat emotion on the basis of an identifier (for example, it may be a name or a serial number) of the WeChat emotion.

2) For example, assuming for game service(s), a client (a client running WeChat) may report a game reserved (here, reservation may be considered as downloading and installation) by the client and a usage amount (running an game application once is considered as using once) of the reserved game to the server, and the server selects game(s) reserved by clients in a local dimension and usage amounts of the reserved game(s), and may analyze the number of clients which reserve the same game in the clients in the local dimension and the number of times (i.e. the usage amount) for which the game is used by the clients which reserve the game on the basis of an identifier (for example, it may be a name or a serial number) of the game.

3) For example, assuming for electronic shopping service (s), a client (a client running WeChat) may report an electronic shopping service (such as Jingdong Shopping and Suning Shopping) reserved (here, reservation may be considered as downloading and installation of an electronic shopping function) by the client and a usage amount (running the electronic shopping function once is considered as using once) of the reserved electronic shopping service to the server, and the number of clients which reserve the same electronic shopping service in clients in a local dimension and the number of times (i.e. the usage amount) for which the electronic shopping service is used by the clients which reserve the electronic shopping service may be analyzed on the basis of an identifier (for example, it may be a name or a serial number) of the electronic shopping service.

4) For example, for food ordering service(s), a client (a client running WeChat) may report food ordering service(s) (such as Meituan Take-away and Eleme Take-away) reserved (here, reservation may be considered as downloading of a function of the food ordering service) by the client and usage amount(s) (running a food ordering function once is considered as using once) of the reserved food ordering service(s) to the server, and the number of clients which reserve the same food ordering service in clients in a local dimension and the number of times (i.e. the usage amount) for which the food ordering service is used by the clients which reserve the food ordering service may be analyzed on the basis of an identifier (for example, it may be a name or a serial number) of the food ordering service.

In Step S202, the reservation amount of the service and a usage-reservation ratio parameter of the service are processed on the basis of a characteristic value strategy, to obtain a characteristic value of the service.

The characteristic value of the service is configured to represent quality of the service, and thus may be associated with a recommendation degree of the service. If the characteristic value is higher, the represented quality of the service is higher, so that the service is worthier of being recommended to a user of another client.

Step S203: a graphical interface of the client is called to present a characteristic value ranking result of the plurality of services in the local dimension.

For example, a characteristic value ranking result of the service(s) in at least one local dimension is presented to a user. For example, for WeChat emotions, a characteristic value ranking result of WeChat emotions used by users, in different age groups, of clients is presented, or, a characteristic value ranking result of WeChat emotions used by users, in different regions, of clients is presented.

Or different candidate local dimensions are presented, such as an age group dimension and a region dimension, for the user to view a characteristic value ranking result of the service(s) in a selected local dimension.

When the client requests for a service list, a characteristic value descending ranking result of the services may be sent to the client as a reference for service reservation of the user, and when the user triggers reservation of a service, data of the corresponding service (such as an installation instruction, for presenting the corresponding service in the graphical interface of the client) may be transmitted to the client according to an identifier (such as a service name or a serial number) of the service reserved by the request reported by the client.

In another implementation of the embodiment of the disclosure, a service processing method is provided, which is configured to rank services on the basis of characteristic values of the services and cause a client to present a ranking result for a user to reserve a service with reference to the ranking result. Here, the services refer to offline services or online services which may be reserved with a client (such as WeChat and WhatsApp) and used on the client. The online services may include a game, electronic shopping (for example, the user reserves Jingdong Shopping service through the client, and may subsequently order a commodity by virtue of the Jindong Shopping service), a chatting emotion (an emoticon which may be used for communication through the client, for example, the user reserves a set of chatting emotions through the client, and may subsequently use emoticons in the set of chatting emotions during communication with another client through the client), and a display theme (a display effect which may be replaceable by the client, if a theme is reserved, the client may subsequently be set to use the theme instead of a default theme of the client to achieve a personalized display effect of the client). The services may also include the online services, including dining and housekeeping. For example, if the user reserves KFC delivery through the client, take-away food of KFC may subsequently be ordered with the service.

Figure 3:
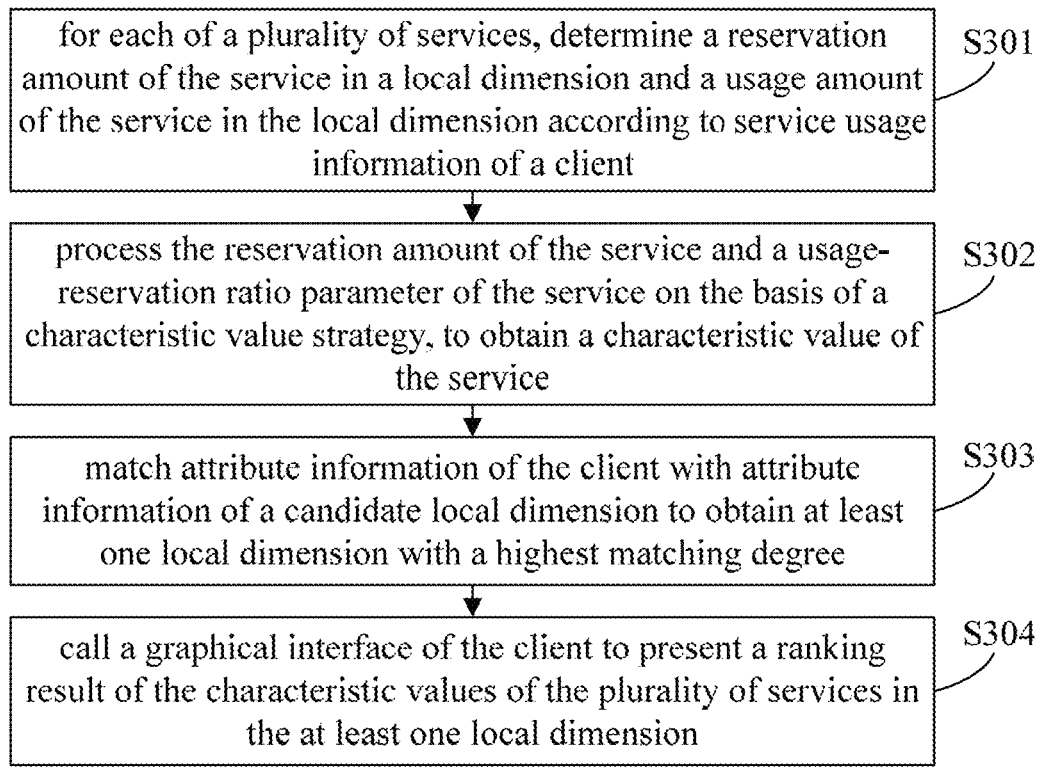
FIG. 3 is another implementation flowchart of a service processing method according to an embodiment of the disclosure.

FIG. 3 is an optional flowchart of a service processing method, and the method includes the following steps.

In Step S301, for each of a plurality of services, a reservation amount of the service in a local dimension and usage amount(s) of the service(s) in the local dimension are determined according to service usage information of a client.

Here, the local dimension may be at least one of:

1) a region of the client, i.e. a geographic position where the client is. Division of the geographic position may adopt administrative division of a province, a city and the like, and may also adopt a geographic grid;

2) an age group of a user of the client. Age information of users of different clients may adopt personal data for registration of the users with the clients;

3) a gender of the user of the client. Gender information of the users of the different clients may adopt the personal data for registration of the users with the clients; and 4) the gender of the user of the client. The gender information of the users of the different clients may adopt the personal data for registration of the users with the clients.

The reservation amount of the service in the local dimension and the usage amount of the service in the local dimension may be determined in the following manner: service usage information reported by clients in the local dimension is screened from service usage information reported by clients, and the service usage information of the clients in the local dimension is analyzed to determine service(s) reserved by each client in the clients in the local dimension and the number(s) of times for which the reserved service(s) is/are used by each client; and the number of the clients which reserve each service is analyzed as a reservation amount of the service in the local dimension according to an identifier of the service, and the number of times for which the service is used by the clients in the local dimension is analyzed as the usage amount of the service in the local dimension according to the identifier of the service.

Description will be made below with reference to different examples.

1) For example, for WeChat emotion service(s), a client (a client running WeChat) may report emotion(s) reserved (here, reservation may be considered as downloading and installation) by the client and usage amount(s) (sending an emoticon is considered as using the reserved emotion once) of the reserved emotion(s) to a server, and the server selects emotions reserved by clients in a local dimension and usage amount(s) of the reserved emotion(s), and may analyze the number of clients which reserve the same WeChat emotion in the clients in the local dimension and the number of times (i.e. the usage amount) for which the WeChat emotion is used by the clients which reserve the WeChat emotion on the basis of an identifier (for example, it may be a name or a serial number) of the WeChat emotion.

2) For example, for game service(s), a client (a client running WeChat) may report a game reserved (here, reservation may be considered as downloading and installation) by the client and a usage amount (running an game application once is considered as using once) of the reserved game to the server, and the server screens emotions reserved by clients in a local dimension and usage amounts of the reserved service, and may analyze a number of clients which reserve the same game in the clients in the local dimension and a number of times (i.e. the usage amount) for which the game is used by the clients which reserve the game on the basis of an identifier (for example, it may be a name or a serial number) of the game.

3) For example, for electronic shopping service(s), a client (a client running WeChat) may report electronic shopping service(s) (such as Jingdong Shopping and Suning Shopping) reserved (here, reservation may be considered as downloading and installation of an electronic shopping function) by the client and usage amount(s) (running the electronic shopping function once is considered as using once) of the reserved electronic shopping service(s) to the server, and the number of clients which reserve the same electronic shopping service in clients in a local dimension and the number of times (i.e. the usage amount) for which the electronic shopping service is used by the clients which reserve the electronic shopping service may be analyzed on the basis of an identifier (for example, it may be a name or a serial number) of the electronic shopping service.

4) For example, for food ordering service(s), a client (a client running WeChat) may report food ordering service(s) (such as Meituan Take-away and Eleme Take-away) reserved (here, reservation may be considered as downloading of a function of the food ordering service) by the client and usage amount(s) (running a food ordering function once is considered as using once) of the reserved food ordering service(s) to the server, and the number of clients which reserve the same food ordering service in clients in a local dimension and the number of times (i.e. the usage amount) for which the food ordering service is used by the clients which reserve the food ordering service may be analyzed on the basis of an identifier (for example, it may be a name or a serial number) of the food ordering service.

In Step S302, the reservation amount of the service and a usage-reservation ratio parameter(s) of the service are processed on the basis of a characteristic value strategy, to obtain a characteristic value of each service.

The characteristic value of the service may be configured to represent quality of the service, and thus may be associated with a recommendation degree of the service. If the characteristic value is higher, the represented quality of the service is higher, so that the service is worthier of being recommended to a user of another client.

In Step S303, attribute information of the client is matched with attribute information of a candidate local dimension to obtain at least one local dimension with a highest matching degree.

The attribute information of the client may be one or more of the abovementioned region of the client, the age group of the user of the client and the gender of the user of the client.

For example, for a region dimension of the client, if the attribute information of the client is "cell 1", it is indicated that the user of the client is currently in a geographic region "cell 1", and then cell 1 is matched with the attribute information of the candidate local dimension. A candidate local dimension (with the highest matching degree) with attribute information "cell 1" or employing a geographic position in cell 1 as attribute information is preferably selected, and second, a candidate local dimension of which attribute information including cell 1 may be selected. For example, for attribute information "building 1 in cell 1", "cell 1" and "cell 2" of the candidate local dimension, the attribute information "cell 1" of the candidate local dimension is completely matched with the attribute information "cell 1" of the client, and the attribute information "building 1 in cell 1" of the candidate local dimension forms the highest matching degree with the attribute information "cell 1" of the client.

For example, for the age group of the user of the client, if the attribute information of the client is "20", it is indicated that an age of the user of the client is 20 years old, and 20 is matched with the attribute information of the candidate local dimension. A candidate local dimension (with the highest matching degree) with attribute information "20" or a candidate local dimension (with the second highest matching degree) with attribute information of which a value is fluctuated by 2 with 20 as a reference is preferably selected.

For example, for the gender of the user of the client, if the attribute information of the client is "male", it is indicated that the gender of the user of the client is male, and then the attribute information "male" is matched with the attribute information of the candidate local dimension. A candidate local dimension (matched) with attribute information "male" is selected.

The abovementioned dimensions may be freely combined. For example: the region dimension of the client and the age group of the user of the client are combined. If the attribute information of the client is "cell 1"+"20", it is indicated that the user of the client is currently in a geographic region "cell 1" and the age of the user of the client is 20, and then cell 1 is matched with the attribute information of the candidate local dimension. A candidate local dimension (with the highest matching degree) with attribute information "cell 1" or employing a geographic position in cell 1 as attribute information is preferably selected, and second, a candidate local dimension of which attribute information including cell 1 may be selected. For example, for attribute information "building 1 in cell 1", "cell 1" and "cell 2" of the candidate local dimension, the attribute information "cell 1" of the candidate local dimension is completely matched with the attribute information "cell 1" of the client, and the attribute information "building 1 in cell 1" of the candidate local dimension forms the highest matching degree with the attribute information "cell 1" of the client. In the selected candidate local dimension forming the highest matching degree with the attribute information "cell 1", 20 is matched with the attribute information of the candidate local dimension. A candidate local dimension (with the highest matching degree) with attribute information "20" or a candidate local dimension (with the second highest matching degree) with attribute information of which a value is fluctuated by 2 with 20 as a reference is preferably selected.

For example, the region dimension of the client, the age group of the user of the client and the gender are combined. If the attribute information of the client is "cell 1"+"20"+ "male", it is indicated that the user of the client is currently in a geographic region "cell 1", the age of the user of the client is 20 and the gender is male, and then cell 1 is matched with the attribute information of the candidate local dimension. A candidate local dimension (with the highest matching degree) with attribute information "cell 1" or employing a geographic position in cell 1 as attribute information is preferably selected, and second, a candidate local dimension of which attribute information including cell 1 may be selected. For example, for attribute information "building 1 in cell 1", "cell 1" and "cell 2" of the candidate local dimension, the attribute information "cell 1" of the candidate local dimension is completely matched with the attribute information "cell 1" of the client, and the attribute information "building 1 in cell 1" of the candidate local dimension forms the highest matching degree with the attribute information "cell 1" of the client. In the selected candidate local dimension forming the highest matching degree with the attribute information "cell 1", 20 is matched with the attribute information of the candidate local dimension. A candidate local dimension (with the highest matching degree) with attribute information "20" or a candidate local dimension (with the second highest matching degree) with attribute information of which a value is fluctuated by 2 with 20 as a reference is preferably selected.

In the selected candidate local dimension forming the highest matching degree with the attribute information "cell 1"+"20", the attribute information "male" is matched with the attribute information of the candidate local dimension. A candidate local dimension (matched) with attribute information "male" is selected. Therefore, the candidate local dimension forming the highest matching degree with the attribute information "cell 1"+"20"+"male" is obtained.

In Step S304, a graphical interface of the client is called to present a characteristic value ranking result of the plurality of services in the at least one local dimension.

1) When the attribute information matched in Step S303 is the region of the client, a ranking result of characteristic values of services used by clients at the same geographic position with the user of the client is presented.

2) When the attribute information matched in Step S303 is the age group of the user of the client, a ranking result of characteristic values of services used by users in the same age group with the user of the client through clients is presented.

3) When the attribute information matched in Step S303 is the gender of the user of the client, a ranking result of characteristic values of services used by users of the same gender with the user of the client through clients is presented.

4) When the attribute information matched in Step S303 is the region of the client+age group of the user of the client, a ranking result of characteristic values of services used by users in the same region and the same age group with the user of the client through clients is presented.

5) When the attribute information matched in Step S303 is the region of the client+age group of the user of the client+the gender, a ranking result of characteristic values of services used by users in the same region and the same age group and of the same gender with the user of the client through clients is presented.

When the client requests for a service list, a descending ranking result of characteristic values of the services in the dimension forming the highest matching degree with the attribute information of the client may be sent to the client, and has a higher reference value for service reservation of the user of the client, and when the user triggers reservation of a service, data of the corresponding service (such as an installation instruction, for presenting the corresponding service in the graphical interface of the client) may be transmitted to the client according to an identifier (such as a service name or a serial number) of the service reserved by the request reported by the client.

Figure 4:
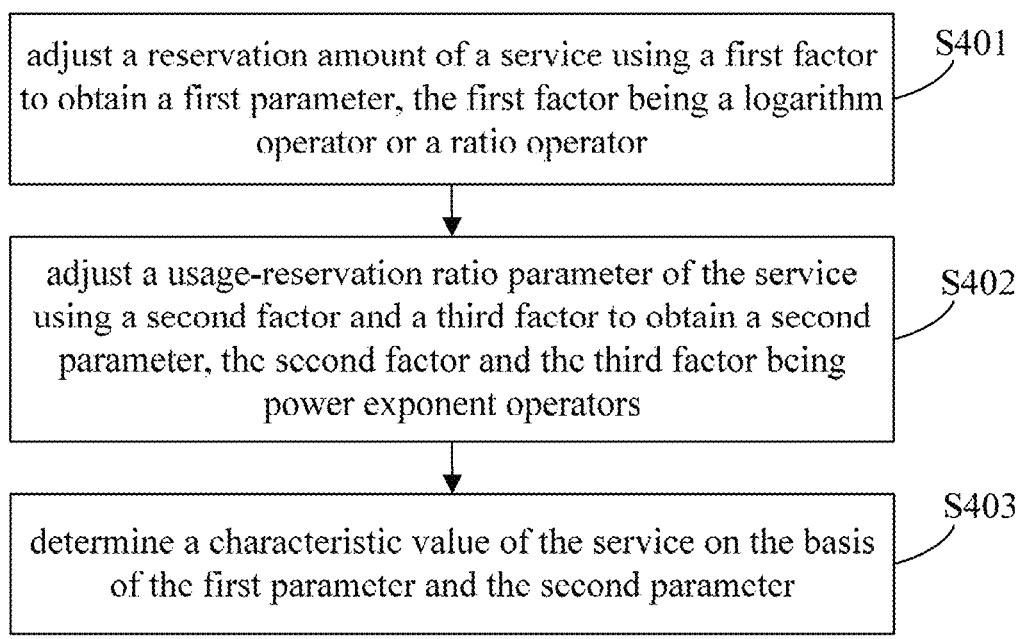
FIG. 4 is another implementation flowchart of a service processing method according to an embodiment of the disclosure.

Following the abovementioned implementation, description about the implementation that the reservation amount(s) of the service(s) and the usage-reservation ratio parameter(s) of the service(s) are processed on the basis of the characteristic value strategy to obtain the characteristic value(s) of the service(s) will be made. As shown in FIG. 4, determination of the characteristic value(s) of the service(s) may be implemented by the following steps.

In Step S401, the reservation amount(s) of the service(s) is adjusted by virtue of a first factor to obtain a first parameter, where the first factor may be a logarithm operator or a radio operator.

As an example, the first parameter may be $$\frac{\text{download}}{t^a},$$

or may be $\log_a \text{download}$, and may further be $$\frac{\text{download} + \text{send}}{t^a},$$

where "a" is the first factor, "download" is the reservation amount of the service, "send" is the usage amount of the service, and "t" is a provision time length of the service.

In Step S402, the usage-reservation ratio parameter of the service is adjusted by virtue of a second factor and a third factor to obtain a second parameter, where the second factor and the third factor may be power exponent operators.

As an example, the second parameter may be $$1 + k\left(\frac{\text{send}}{\text{download}}\right)^b,$$

where k is the second factor, and b is the third factor.

In Step S403, the characteristic value of the service is determined on the basis of the first parameter and the second parameter.

As an example, when y is employed to represent the characteristic value, the characteristic value may be represented by any one of the following formulae:

$$y = \frac{\text{download} + \text{send}}{t^a}\left(1 + k\left(\frac{\text{send}}{\text{download}}\right)^b\right); \quad (1)$$

$$y = \frac{\text{download}}{t^a}\left(1 + k\left(\frac{\text{send}}{\text{download}}\right)^b\right); \text{ and} \quad (2)$$

$$y = \log_a \text{download}\left(1 + k\left(\frac{\text{send}}{\text{download}}\right)^b\right). \quad (3)$$

Introducing an exponential function into a calculation formula of the characteristic value may eliminate the problem of relatively high characteristic value caused by an accumulated usage amount of the service which is provided for a long time, so that service which is newly provided and has high quality may be endowed with a relatively higher characteristic value, and may easily attract an attention of a user in characteristic value ranking. Descriptions will be made below with reference to test data of WeChat emotion service.

Figure 5:
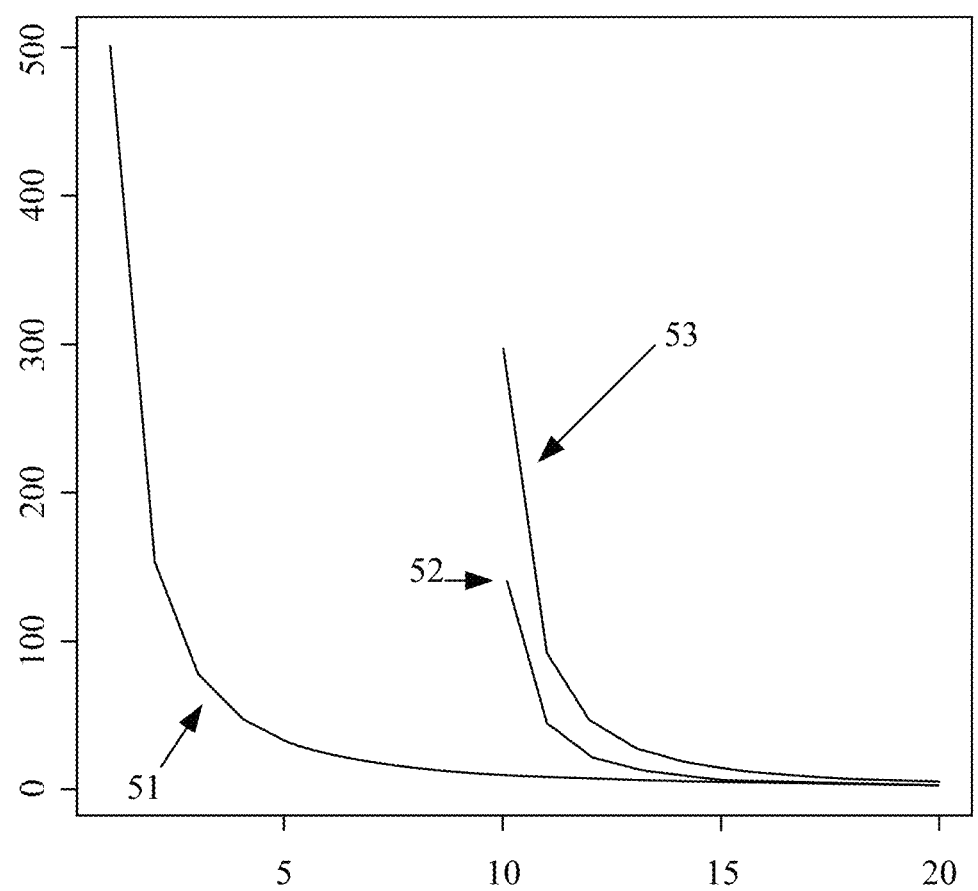
FIG. 5 is a schematic diagram of a characteristic value of a WeChat emotion according to an embodiment of the disclosure.
Figure 7:
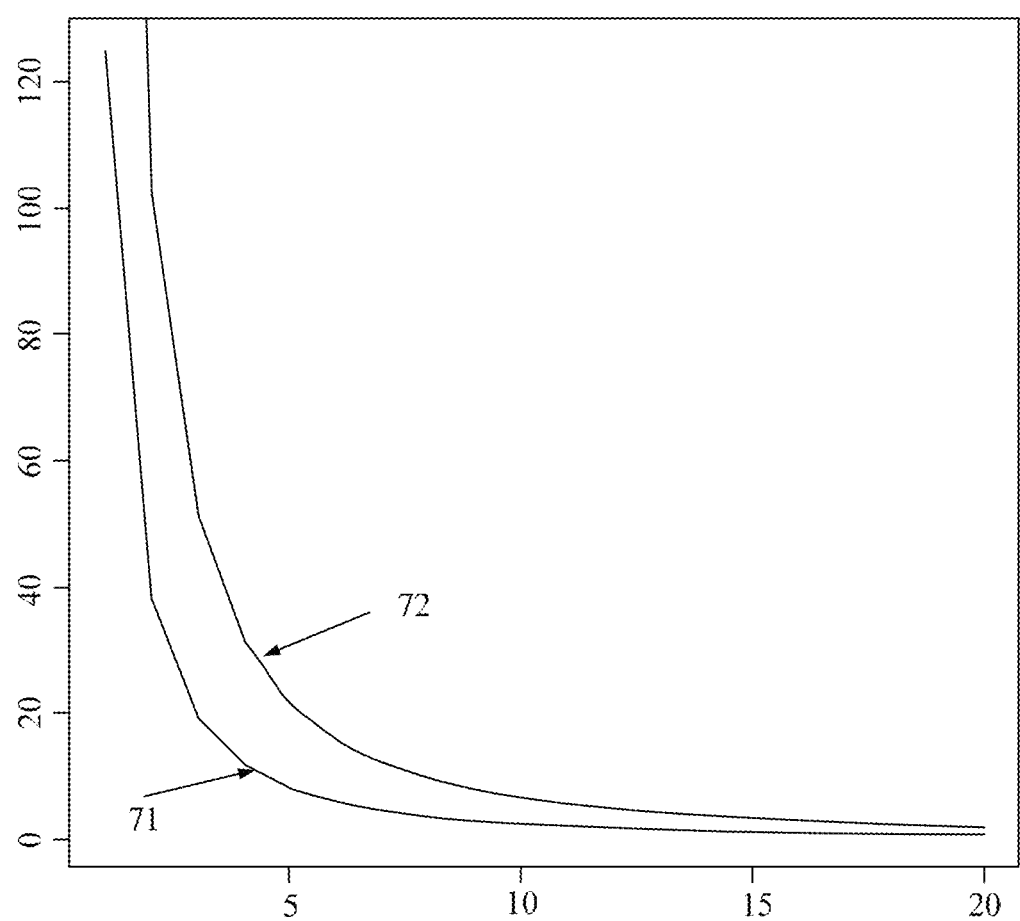
FIG. 7 is another schematic diagram of a characteristic value of a WeChat emotion according to an embodiment of the disclosure.

FIG. 5 and FIG. 7 show change diagrams of values of y based on formula (1), a horizontal ordinate represents values of a dependent variable parameter such as t and k, and a vertical ordinate represents the values of y.

As shown in FIG. 5, curve 51 represents function 50/ (t^1.7), curve 52 represents function 150/((k−9)^1.7), curve 53 is a curve of y for an emotion B (and emotion C, provision time of the emotion B and the emotion C is 9 hours latter than an emotion A), and represents function 300/((k+ 9)^1.7). When the value of a is 1.7, a performance score (characteristic value) of the emotion A which is provided earlier has been lower than the emotion B and the emotion C after 5 hours, and if there is no more downloading amount (corresponding to a reservation amount) and sending user number (corresponding to a usage amount) for the emotion A, a characteristic value rank of the emotion A may be reduced due to a low performance score.

Figure 6:
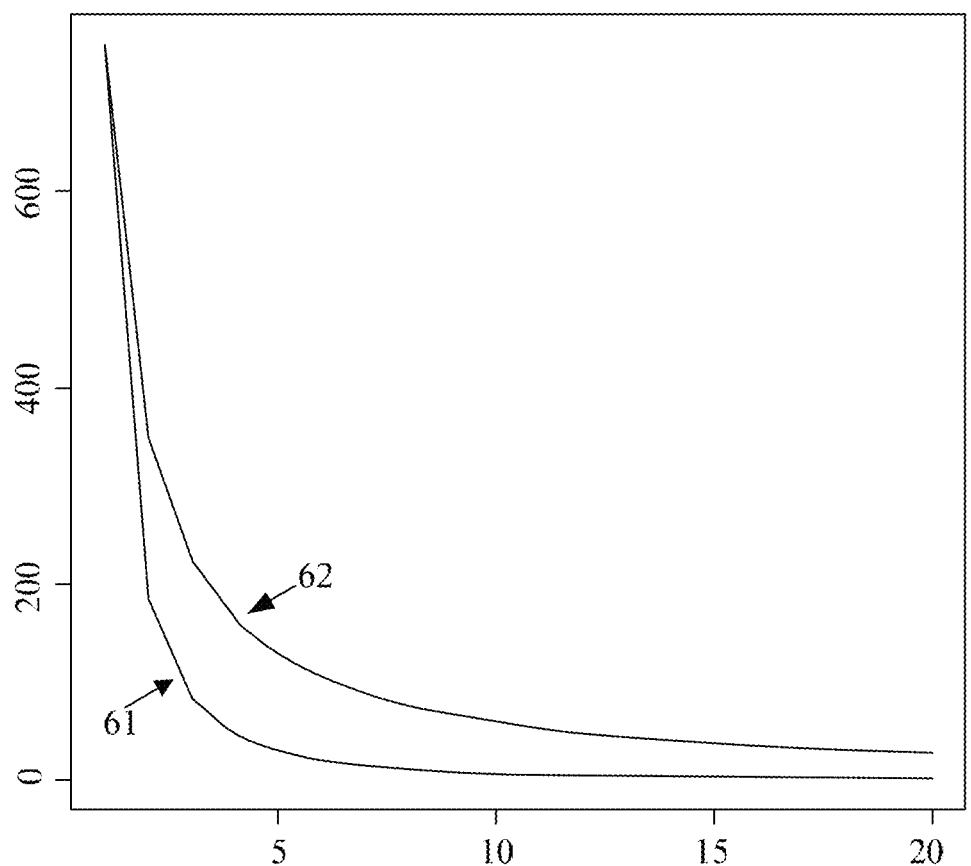
FIG. 6 is another schematic diagram of a characteristic value of a WeChat emotion according to an embodiment of the disclosure.

When a rank of an emotion which has been provided for a long time is expected to be rapidly lowered, that is, the value of a may be set to be higher than 1.7, and if the value of a is higher, the characteristic value rank of the emotion which has been provided for a long time may be lowered more rapidly. FIG. 6 shows a curve 61 and curve 62 of y varying along with a when a ratio of a sending user number and downloading amount of an emotion is 0.5, where values of b and k are 1, the curve 61 represents function 500*1.5/ (t^2), and the curve 62 represents function 500*1.5/(t^1.1).

k may be set according to a degree of emphasis of a business on emotion usage. If more users are expected to download emotions and use the emotions, a value of k is set into a relatively large parameter; and if only downloading amounts and sending user numbers of the emotions are concerned, k may be set to be 0. FIG. 7 shows a curve 71 and a curve 72, the curve 71 represents function 500*(1/4)/ (t^1.7), and the curve 72 represents function 500*(2/3)/ (t^1.7). When the emotion A is downloaded by 400 users and sent by 100 users while the emotion B is downloaded by 300 users and sent by 200 users, a characteristic value of the emotion B is higher than the emotion A.

Figure 8:
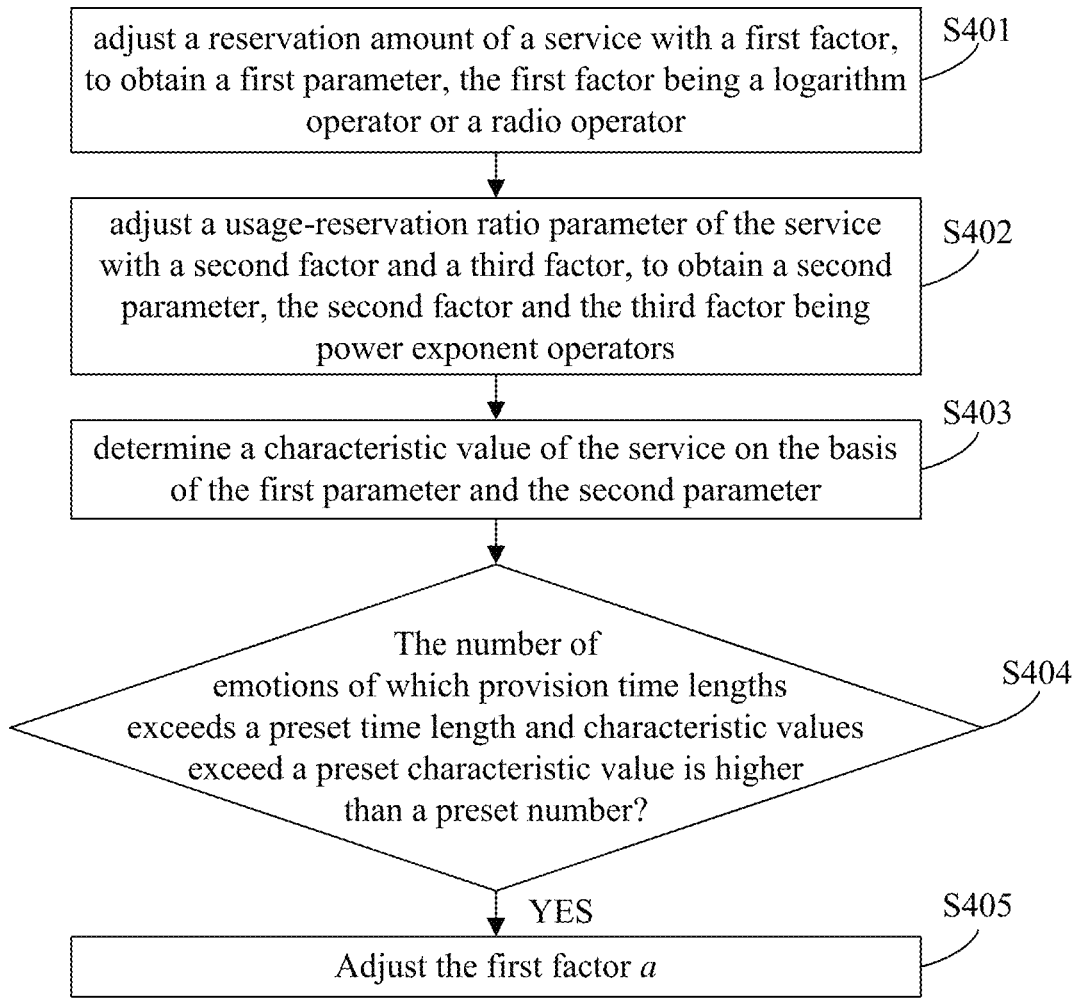
FIG. 8 is another implementation flowchart of a service processing method according to an embodiment of the disclosure.

The abovementioned implementation mode is continued to be described. As shown in FIG. 8, based on FIG. 4, after characteristic values of an emotion in different local dimensions are determined, the following steps may further be executed.

In Step S404, whether a number of emotions of which provision time lengths exceed a preset time length (that is, the provision time lengths are relatively large) and characteristic values exceed a preset characteristic value is higher than a preset number or not is judged, and if YES, it is indicated that the characteristic values of the emotions with relatively large provision time lengths are usually relatively large, Step S405 is required to be executed to regulate a (i.e. the first factor) until the number of the emotions of which the provision time lengths exceed the preset time length (that is, the provision time lengths are relatively small) and the characteristic values exceed the preset characteristic value is lower than the preset number, thereby increasing characteristic values of emotions with relatively small provision time lengths and further improving tanks in a characteristic value ranking result to enable emotions with relatively small provision time lengths but relatively high recommendation degrees to attract the attention of the user more easily; and if a judgment result in Step S404 is NO, it is indicated that there is no condition that the characteristic values of the emotions with the relatively large provision time lengths are usually relatively large, and the client may present the current characteristic value ranking result.

Figure 9:
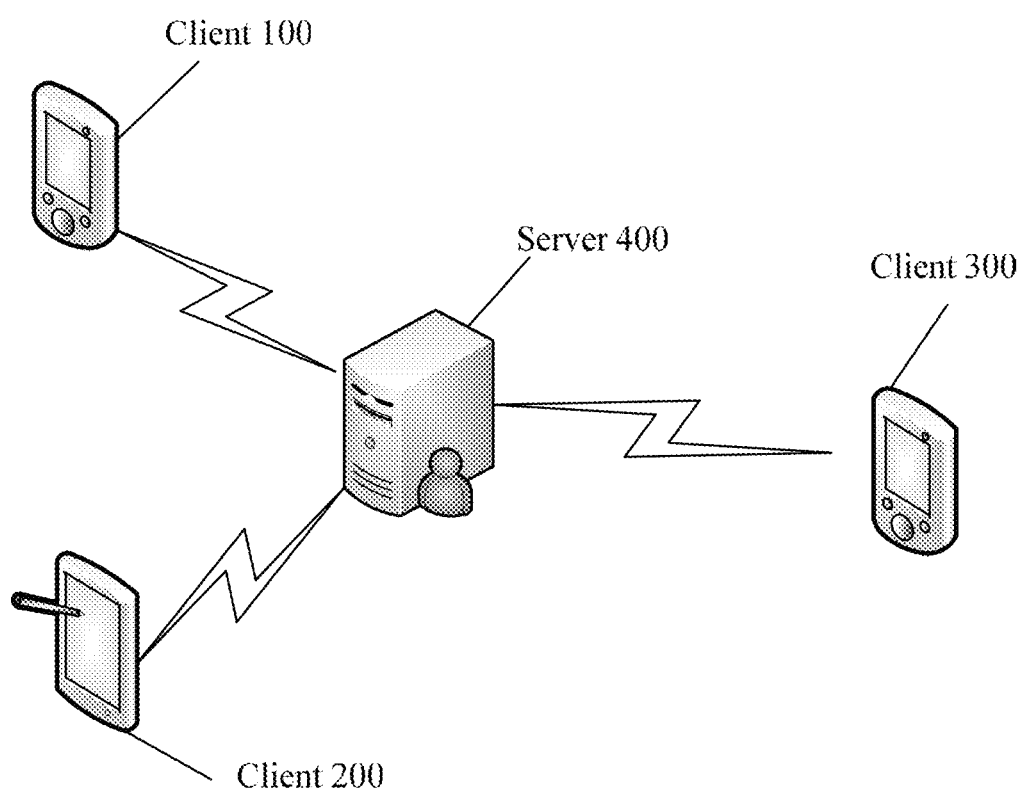
FIG. 9 is a schematic diagram of communication for service processing between a client and a server according to an embodiment of the disclosure.

Description about implementation of characteristic value ranking a WeChat emotion by combining an interaction process of a server and clients will also be made with the condition that the service is the WeChat emotion as an example. Here, the clients are WeChat clients, and may run in terminal equipment such as an intelligent mobile phone and a tablet computer, and the server may be a single server or a server cluster, which is called a server hereinafter. The clients may access the server in a manner of cellular communication and Wireless Fidelity (WiFi). As shown in FIG. 9, each client (client 100, client 200 and client 300) may periodically report WeChat emotion usage information to the server 400, including emotions downloaded by each client and numbers of times for which different emotions are sent by each client (wherein sending an emoticon in an emotion theme by a client is considered as sending an emotion once). The server 400 determines and rank characteristic values of the WeChat emotions in a global dimension according to the WeChat emotion usage information sent by each client, and may also determine characteristic values of different WeChat emotions used by the clients in different groups (i.e. local dimensions, such as different age groups, different region groups and WeChat friend groups) and rank the characteristic values, a specific implementation manner referring to records in the abovementioned embodiment.

Figure 10:
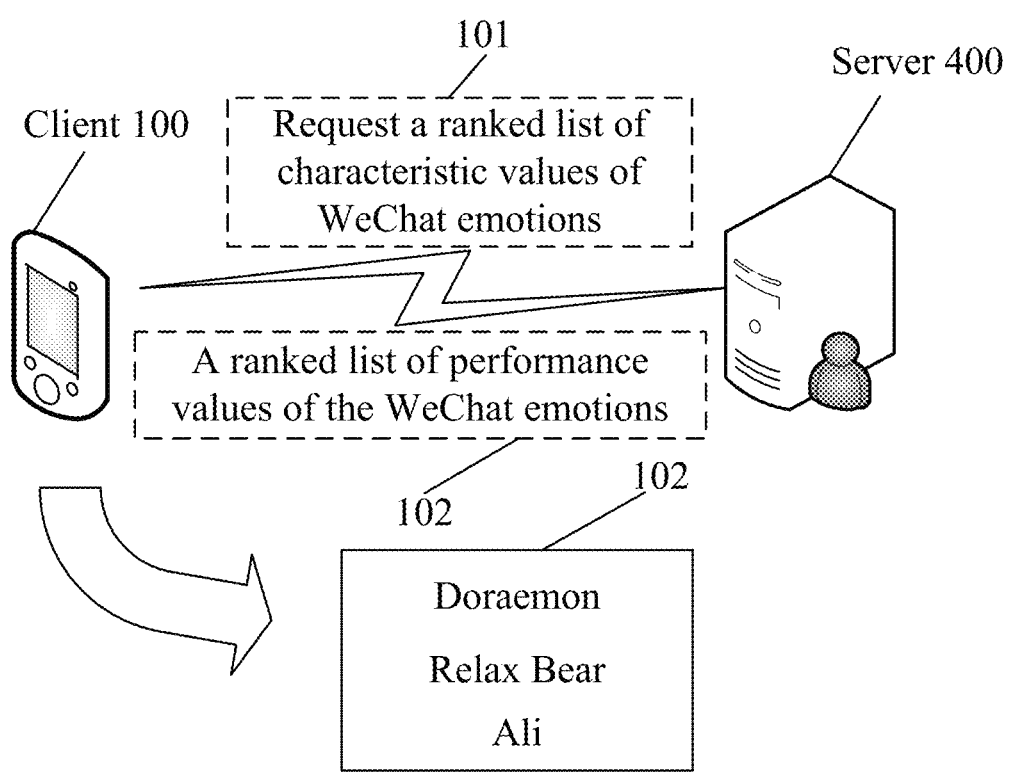
FIG. 10 is another schematic diagram of communication for service processing between a client and a server according to an embodiment of the disclosure.

As shown in FIG. 10, based on FIG. 9, when the client 100 requests for a characteristic value rank 101 of WeChat emotions, the server 400 determines a group to which a user of the client 100 belongs according to age and gender information of the user of the client 100, and sends a characteristic value ranking result 102 of WeChat emotions of the group to the client 100 to be displayed for the user of the client 100 to select.

Figure 11:
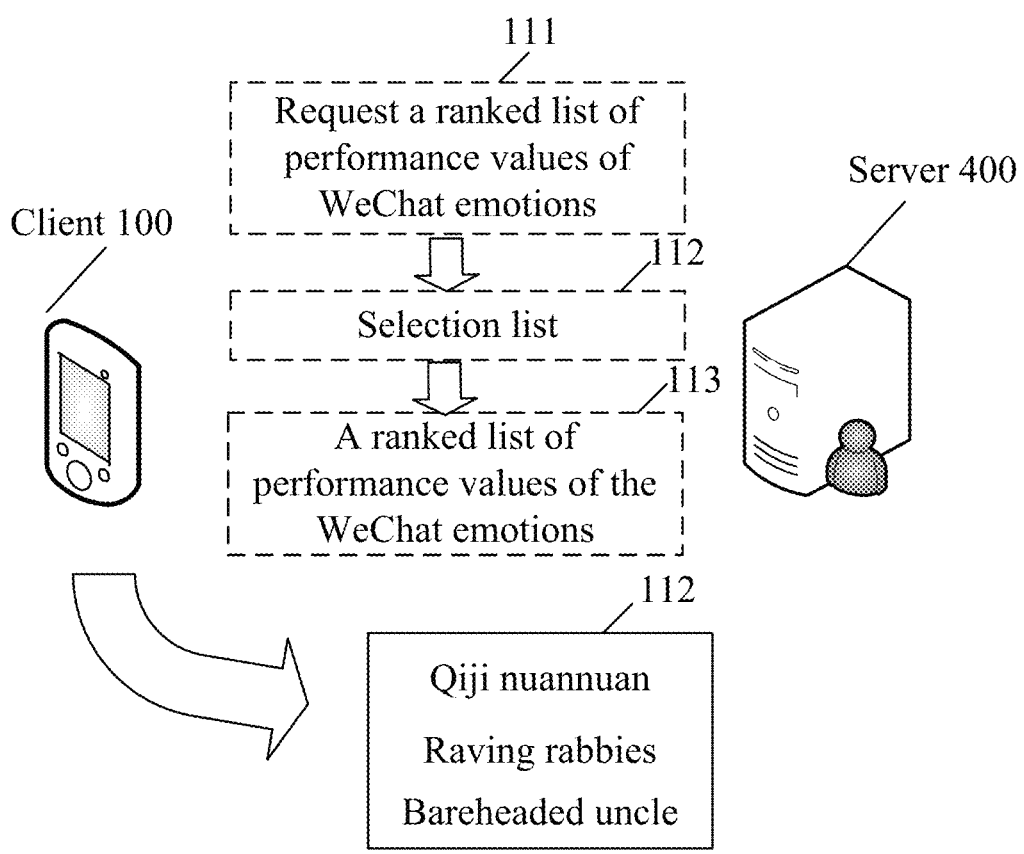
FIG. 11 is another schematic diagram of communication for service processing between a client and a server according to an embodiment of the disclosure.

As shown in FIG. 11, based on FIG. 9, when the client 100 requests for a characteristic value rank 111 of WeChat emotions, the server 400 has not acquired the age and gender information of the user of the client 100, and sends a group selection list 112 to the client, including a selection list of different genders and ages, and prompts the user of the client 100 to select a characteristic value ranking result of WeChat emotions of a corresponding group or not. If the client 100 selects the corresponding age and gender information, the server 400 may send a characteristic value ranking result 113 of WeChat emotions of the corresponding group to the client 100 for the user of the client 100 to select.

Figure 12:
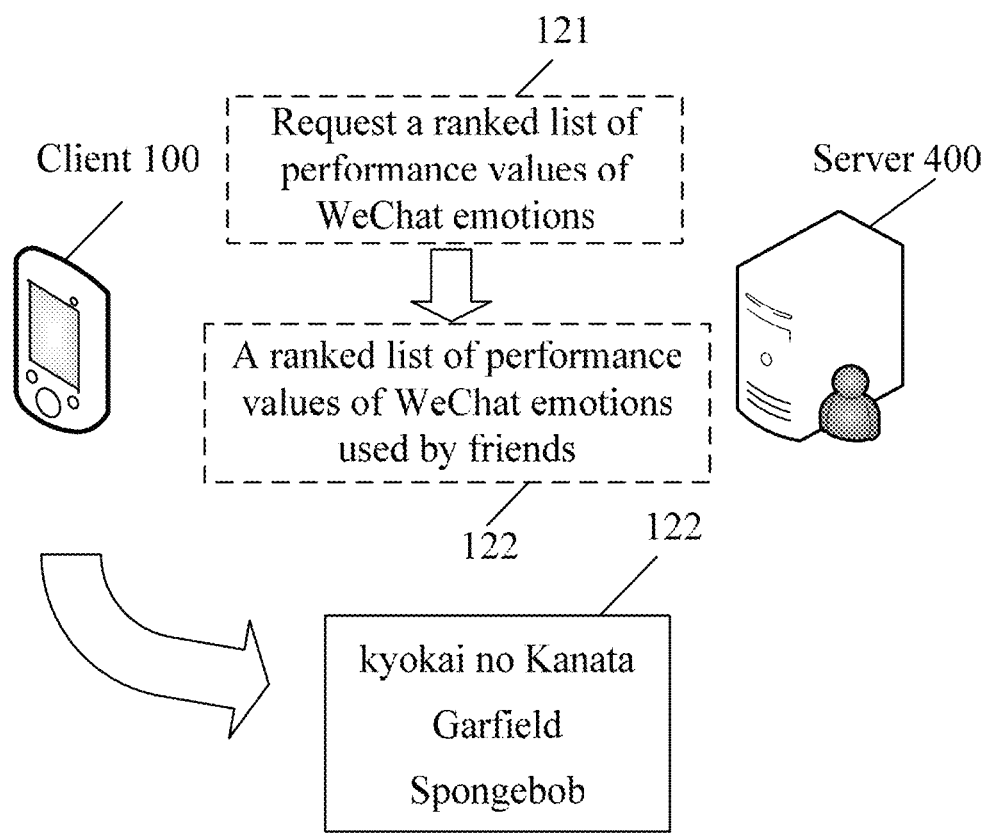
FIG. 12 is another schematic diagram of communication for service processing between a client and a server according to an embodiment of the disclosure.

As shown in FIG. 12, based on FIG. 9, when the client 100 requests for a characteristic value rank 121 of WeChat emotions, the server 400 acquires WeChat friends of the user of the client 100, and sends a characteristic value ranking result 122 of WeChat emotions used by a WeChat friend group of the user of the client 100 to the client, so that the user of the client 100 may know a characteristic value rank of the WeChat emotions used by his/her own friends, and the user of the client 100 may conveniently select a WeChat emotion desired to use.

Figure 13:
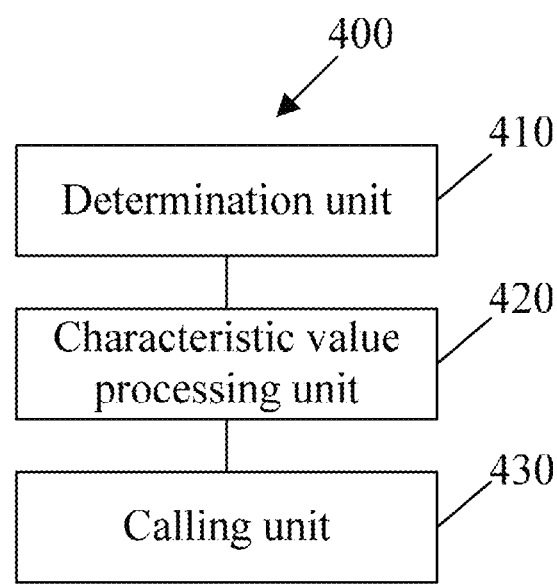
FIG. 13 is a functional structure diagram of a server according to an embodiment of the disclosure.

A functional structure of the server 400 is continued to be described. FIG. 13 is an optional functional structure diagram of a server 400. The server 400 may include a determination unit 410, a characteristic value processing unit 420 and a calling unit 430.

The determination unit 410 is configured to, for each of a plurality of services, determine a reservation amount of the service and a usage amount of the service according to service usage information of a client.

The characteristic value processing unit 420 is configured to process the reservation amount of the service and a usage-reservation ratio parameter of the service on the basis of a characteristic value strategy to obtain a characteristic value of each service, wherein the usage-reservation ratio parameter of the service is determined on the basis of the reservation amount of the service and the usage amount of the service; and The calling unit 430 is configured to call a graphical interface of the client to present a ranking result of characteristic values of the plurality of services.

As an example, the determination unit 410 is further configured to determine the reservation amount of the service in a global dimension and the usage amount of the service in the global dimension and/or determine the reservation amount of the service in a local dimension and the usage amount of the service in the local dimension.

As an example, the calling unit 430 is further configured to call the graphical interface of the client to present a characteristic value ranking result of the service in the global dimension and/or call the graphical interface of the client to present a ranking result of characteristic values of the plurality of services in the local dimension.

As an example, the calling unit 430 includes a matching module and a calling module.

The matching module is configured to match attribute information of the client with attribute information of a candidate local dimension to obtain at least one local dimension with a highest matching degree.

The calling module (connected with the matching module) is configured to call the graphical interface of the client to present a ranking result of characteristic values of the plurality of services in the at least one local dimension.

As an example, the characteristic value processing unit 420 includes a first operation module, a second operation module and a third operation module.

The first operation module is configured to adjust the reservation amount of the service to obtain a first parameter by virtue of a first factor, the first factor being a logarithm operator or a ratio operator.

The second operation module (connected with the first operation module) is configured to adjust the usage-reservation ratio parameter of the service by virtue of a second factor and a third factor to obtain a second parameter, the second factor and the third factor being power exponent operators.

The third operation module (connected with the second operation module) is configured to determine the characteristic value of the service on the basis of the first parameter and the second parameter.

As an example, the characteristic value processing unit 420 further includes an adjustment module (connected with the first operation module), configured to adjust the first factor until an amount of service of which provision time lengths exceed a preset time length and characteristic values exceed a preset characteristic value is lower than a preset amount.

During a practical application, the determination unit 410 and the characteristic value processing unit 420 may be implemented by a Micro Processing Unit (MCU), Central Processing Unit (CPU), Field-Programmable Gate Array (FPGA) or dedicated integrated circuit in the server 400; and the calling unit 430 may be implemented by an integrated circuit module supporting network communication or an integrated circuit module supporting cellular communication.

Figure 14:
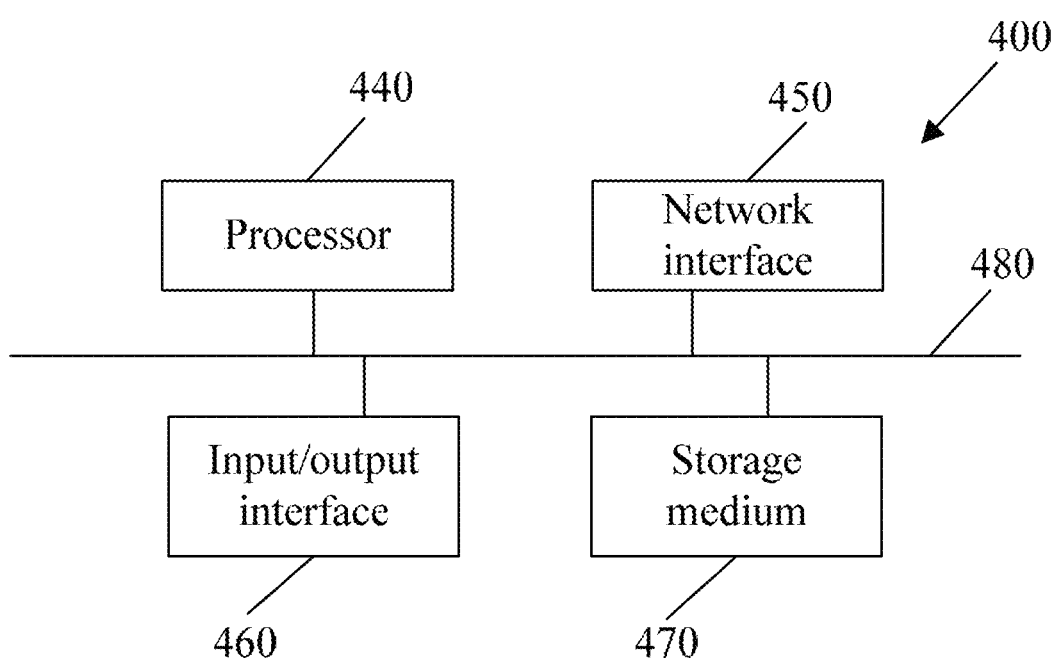
FIG. 14 is a hardware structure diagram of a server according to an embodiment of the disclosure.

FIG. 14 exemplarily shows an optional hardware structure diagram of a server 400. The server includes a processor 440, an input/output interface 460 (such as one or more of a display, a keyboard, a touch screen, a loudspeaker and a microphone), a storage medium 470 and a network interface 450. The components may be connected for communication through a system bus 480.

The storage medium may be a Read-Only Memory (ROM) (such as a ROM, a FLASH memory and a transfer device), a magnetic storage medium (such as a magnetic tape and a disk driver), an optical storage medium (such as a Compact Disc Read-Only Memory (CD-ROM), a Digital Video Disk Read-Only Memory (DVD-ROM), a paper card and a paper tape) and a program memory of another familiar type. Computer-executable instructions are stored in the computer-readable medium, and the instructions are executed to cause at least one processor in the server to execute the following operations: for each of a plurality of services, determining a reservation amount of the service and a usage amount of the service according to service usage information of a client;

processing the reservation amount of the service and a usage-reservation ratio parameter of the service on the basis of a characteristic value strategy to obtain a characteristic value of the service, wherein the usage-reservation ratio parameter of the service is determined on the basis of the reservation amount of the service and the usage amount of the service; and calling a graphical interface of the client to present a ranking result of the characteristic values of the plurality of services.

The instructions, when being executed, further cause the at least one processor to execute the following operations:

determining the reservation amount of the service in a global dimension and the usage amount of the service in the global dimension; and/or, determining the reservation amount of the service in a local dimension and the usage amount of the service in the local dimension.

The instructions, when being executed, further cause the at least one processor to execute the following operations:

calling the graphical interface of the client to present the ranking result of the characteristic values of the plurality of services in the global dimension; and/or, calling the graphical interface of the client to present the ranking result of the characteristic values of the plurality of services in the local dimension.

The instructions, when being executed, further cause the at least one processor to execute the following operations:

matching attribute information of the client with attribute information of a candidate local dimension to obtain at least one local dimension with a highest matching degree; and calling the graphical interface of the client to present the ranking result of the characteristic values of the plurality of services in the at least one local dimension.

The instructions, when being executed, further cause the at least one processor to execute the following operations:

adjusting the reservation amount of the service by virtue of a first factor to obtain a first parameter, the first factor being a logarithm operator or a ratio operator;

adjusting the usage-reservation ratio parameter of the service by virtue of a second factor and a third factor to obtain a second parameter, the second factor and the third factor being power exponent operators; and determining the characteristic value of the service on the basis of the first parameter and the second parameter.

The instructions, when being executed, further cause the at least one processor to execute the following operations:

adjusting the first factor until a number of services of which provision time lengths exceed a preset time length and characteristic values exceed a preset characteristic value is lower than a preset number.

From the above, the embodiments of the disclosure have the following beneficial effects.

1: The ranking result of the characteristic values of the services is presented to the client, so that it may avoid that since services with relatively large provision time lengths have high characteristic values, the user is unlikely to discover in characteristic value ranking a service which is newly provided but has a high recommendation degree, so as to facilitate the user to reserve a service he/she desires to use.

2: Ranking results of characteristic values corresponding to different local dimensions are sent to the client, so that the user of the client may know reservation and usage conditions of the services in different local dimensions more pertinently, so as to assist the user to rapidly locate a service suitable for use.

Those skilled in the art should know that: all or part of the steps of the abovementioned method embodiment may be implemented by instructing related hardware through a program, the abovementioned program may be stored in a computer-readable storage medium, and the program is executed to execute the steps of the abovementioned method embodiment; and the abovementioned storage medium includes: various media capable of storing program codes such as mobile storage equipment, a ROM, a Random Access Memory (RAM), a magnetic disk or an optical disk.

Or, when being implemented in form of software function module and sold or used as an independent product, the integrated unit of the disclosure may also be stored in a computer-readable storage medium. Based on such an understanding, the technical solutions of the embodiment of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The abovementioned storage medium includes: various media capable of storing program codes such as mobile storage equipment, a ROM, a magnetic disk or an optical disk.

The above is only the specific implementation mode of the disclosure and not intended to limit the scope of protection of the disclosure, and any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A service processing method, comprising:
   for each of a plurality of services, determining, by a server, a reservation amount of the service and a usage amount of the service according to service usage information of a client; wherein the services refer to offline services or online services which are reserved with a client and used on the client;
   processing, by the server, the reservation amount of the service and a usage-reservation ratio parameter of the service based on a characteristic value strategy to obtain a characteristic value of the service, comprising:
   adjusting, by the server, the reservation amount of the service by virtue of a first factor to obtain a first parameter, the first factor being a logarithm operator or a ratio operator;
   adjusting, by the server, the usage-reservation ratio parameter of the service by virtue of a second factor and a third factor to obtain a second parameter, the second factor and the third factor being power exponent operators; and
   determining, by the server, the characteristic value of the service based on the first parameter and the second parameter;
   wherein the usage-reservation ratio parameter of the service refers to a ratio of the usage amount of the service to the reservation amount of the service; the characteristic value of the service is configured to represent quality of the service and a recommendation degree of the service; and
   calling, by the server, a graphical interface of the client to present a ranking result of the characteristic values of the plurality of services.

2. The method according to claim 1, wherein the determining, by the server, a reservation amount of the service and a usage amount of the service comprises at least one of:
   determining the reservation amount of the service in a global dimension and the usage amount of the service in the global dimension; or
   determining the reservation amount of the service in a local dimension and the usage amount of the service in the local dimension.

3. The method according to claim 1, wherein the calling, by the server, a graphical interface of the client to present a ranking result of the characteristic values of the plurality of services comprises at least one of:
   calling the graphical interface of the client to present the ranking result of the characteristic values of the plurality of services in the global dimension; or
   calling the graphical interface of the client to present the ranking result of the characteristic values of the plurality of services in the local dimension.

4. The method according to claim 1, wherein the calling, by the server, a graphical interface of the client to present a ranking result of the characteristic values of the plurality of services comprises:
   matching attribute information of the client with attribute information of a candidate local dimension to obtain at least one local dimension with a highest matching degree; and
   calling the graphical interface of the client to present the ranking result of the characteristic values of the plurality of services in the at least one local dimension.

5. The method according to claim 1, further comprising:
   adjusting the first factor until a number of services of which provision time lengths exceed a preset time length and characteristic values exceed a preset characteristic value is lower than a preset number.

6. A server, comprising:
   a processor; and
   memory for storing instructions executable by the processor,
   wherein the processor is configured to:
   for each of plurality of services, determine a reservation amount of the service and a usage amount of the service according to service usage information of a client;
   wherein the services refer to offline services or online services which are reserved with a client and used on the client;

process the reservation amount of the service and a usage-reservation ratio parameter of the service based on a characteristic value strategy to obtain a characteristic value of the service, comprising:
adjusting the reservation amount of the service by virtue of a first factor to obtain a first parameter, the first factor being a logarithm operator or a ratio operator;
adjusting the usage-reservation ratio parameter of the service by virtue of a second factor and a third factor to obtain a second parameter, the second factor and the third factor being power exponent operators; and
determining the characteristic value of the service based on the first parameter and the secondparameter;
wherein the usage-reservation ratio parameter of the service refers to a ratio of the usage amount of the service to the reservation amount of the service; the characteristic value of the service is configured to represent quality of the service and a recommendation degree of the service; and
call a graphical interface of the client to present a ranking result of the characteristic values of the plurality of services.

7. The server according to claim 6, wherein the processor is further configured to perform at least one of the following:
determine the reservation amount of the service in a global dimension and a usage amount of the service in the global dimension; or
determine the reservation amount of the service in a local dimension and a usage amount of the service in the local dimension.

8. The server according to claim 6, wherein the processor is further configured to perform at least one of the following:
call the graphical interface of the client to present the ranking result of the characteristic values of the plurality of services in the global dimension; or
call the graphical interface of the client to present the ranking result of the characteristic values of the plurality of services in the global dimension.

9. The server according to claim 6, wherein in order to call the graphical interface of the client to present the ranking result of the characteristic values of the plurality of services, the processor is configured to:
match attribute information of the client with attribute information of a candidate local dimension to obtain at least one local dimension with a highest matching degree; and
call the graphical interface of the client to present the ranking result of the characteristic values of the plurality of services in the at least one local dimension.

10. The server according to claim 6, wherein in order to obtain the characteristic value of the service, the processor is further configured to:
adjust the first factor until a number of services of which provision time lengths exceed a preset time length and characteristic values exceed a preset characteristic value is lower than a preset number.

11. A non-transitory computer storage medium for storing executable instructions, wherein the executable instructions are configured to execute a service processing method, the method comprising:
for each of a plurality of services, determining, by a server, a reservation amount of the service and a usage amount of the service according to service usage information of a client; wherein the services refer to offline services or online services which are reserved with a client and used on the client;
processing, by the server, the reservation amount of the service and a usage-reservation ratio parameter of the service based on a characteristic value strategy to obtain a characteristic value of the service, comprising:
adjusting, by the server, the reservation amount of the service by virtue of a first factor to obtain a first parameter, the first factor being a logarithm operator or a ratio operator;
adjusting, by the server, the usage-reservation ratio parameter of the service by virtue of a second factor and a third factor to obtain a second parameter, the second factor and the third factor being power exponent operators; and
determining, by the server, the characteristic value of the service based on the first parameter and the second parameter;
wherein the usage-reservation ratio parameter of the service refers to a ratio of the usage amount of the service to the reservation amount of the service; the characteristic value of the service is configured to represent quality of the service and a recommendation degree of the service; and
calling, by the server, a graphical interface of the client to present a ranking result of the characteristic values of the plurality of services.

12. The non-transitory computer storage medium according to claim 11, wherein the determining, by the server, a reservation amount of the service and a usage amount of the service comprises at least one of:
determining the reservation amount of the service in a global dimension and the usage amount of the service in the global dimension; or
determining the reservation amount of the service in a local dimension and the usage amount of the service in the local dimension.

13. The non-transitory computer storage medium according to claim 11, wherein the calling, by the server, a graphical interface of the client to present a ranking result of the characteristic values of the plurality of services comprises at least one of:
calling the graphical interface of the client to present the ranking result of the characteristic values of the plurality of services in the global dimension; or
calling the graphical interface of the client to present the ranking result of the characteristic values of the plurality of services in the local dimension.

14. The non-transitory computer storage medium according to claim 11, wherein the calling, by the server, a graphical interface of the client to present a ranking result of the characteristic values of the plurality of services comprises:
matching attribute information of the client with attribute information of a candidate local dimension to obtain at least one local dimension with a highest matching degree; and
calling the graphical interface of the client to present the ranking result of the characteristic values of the plurality of services in the at least one local dimension.

15. The non-transitory computer storage medium according to claim 11, wherein the method further comprises:
adjusting the first factor until a number of services of which provision time lengths exceed a preset time length and characteristic values exceed a preset characteristic value is lower than a preset number.

* * * * *